United States Patent Office 3,193,580
Patented July 6, 1965

3,193,580
METHOD OF PRODUCING THIURAM DISULFIDES
Horst Werres, Berlin-Charlottenburg, and Herbert Honigmann, Wolfenbuttel, Germany, assignors to Schering, A.G., Berlin, Germany
No Drawing. Filed Dec. 20, 1960, Ser. No. 104,766
Claims priority, application Germany, Dec. 22, 1959, Sch 27,167
9 Claims. (Cl. 260—567)

The present invention relates to the production of thiuram disulfides, and more particularly to a method of directly producing stable thiuram disulfides in high yield.

Methods have been proposed for producing di-substituted thiuram disulfides by the oxidation of dithiocarbamic acid salts with bromine, iodine or sodium tetrathionate. However the obtained products are relatively unstable and decompose gradually with the formation of mustard oils.

It is accordingly a primary object of the present invention to provide a simple and direct method of producing thiuram disulfides, including di-substituted and tetra-substituted thiuram disulfides whereby the resulting product is produced in stable form and in high yield.

It is another object of the present invention to provide for the production of thiuram disulfides by carrying out the reaction in aqueous solution and resulting in the final product being formed and directly precipitating.

Other objects and advantages of the present invention will be apparent from a further reading of the specification and of the appended claims.

With the above and other objects in view, the present invention mainly comprises the method of producing a thiuram disulfide of the formula

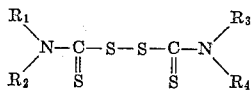

wherein $R_1$, $R_2$, $R_3$ and $R_4$ are each selected from the group consisting of hydrogen, alkyl, alkenyl, aryl, aralkyl and heterocyclic radicals, which comprises reacting a molecule of a salt of a dithiocarbamic acid of the formula

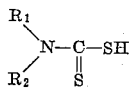

wherein $R_1$ and $R_2$ have the same definitions as above, with a molecule of a salt of a dithiocarbamic acid of the formula

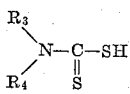

wherein $R_3$ and $R_4$ have the same definitions as above, and with a condensation agent selected from the group consisting of thionyl halides and sulfuryl halides.

In connection with the possible substituents for $R_1$, $R_2$, $R_3$ and $R_4$ it is noted that these radicals may be the same or different. The alkyl is preferably a lower alkyl and the alkenyl is preferably a lower alkenyl. The aryl is preferably phenyl, and in the case of the aralkyl, the aralkyl is preferably a lower alkyl. In addition, the radicals may be substituted, for example by halogen or nitro groups.

The salts of the dithiocarbamic acids which are reacted according to the present invention are preferably alkali metal or ammonium salts.

Thionyl chloride and sulfuryl chloride are the most preferred condensation agents for the purposes of the present invention.

The reaction according to the present invention can be carried out in aqueous solution, under cooling which is generally necessary to compensate for the heat of the reaction.

The reaction according to the present invention results in the direct formation of stable products in good yield, and the products can be further purified, for example by recrystallization or reprecipitation.

The compounds which are produced according to the present invention are useful for various purposes, for example as insecticides, fungicides, parasiticides, and also as vulcanization accelerators.

The following examples are given to further illustrate the present invention. The scope of the invention is not, however, meant to be limited to the specific details of the examples.

*Example I*

This example is directed to the reaction of the sodium salt of N-methyl dithiocarbamic acid with thionyl chloride.

The apparatus used is a three-necked, one-liter, round-bottom flask provided with a KPG stirrer, a thermometer and a dropping funnel.

59.5 g. (0.5 mol) of $SOCl_2$ are added drop-wise slowly and under cooling with ice to 315 g. (1 mol) of a 40.9% aqueous solution of sodium N-methyl dithiocarbamate. In approximately 45 minutes at a temperature of approximately 15–25° C. all of the final chloride is reacted. The precipitated N,N'-dimethyl thiuram disulfide is filtered off by suction, washed with water and dried. The crude yield is 100.3 g. which is equivalent to 94.9% of the theoretical. The purification is accomplished by extraction with carbon disulfide or reprecipitation from chloroform/petroleum ether. The melting point is 99–100° C. (with decomposition).

*Analysis.*—Calculated: C, 22.6%; H, 3.8%; N, 13.2%; S, 60.4%. Found: C, 22.8%; H, 4.0%; N, 13.2%; S, 59.8%.

*Example II*

In this example the sodium salt of N-methyl dithiocarbamic acid is reacted with sulfuryl chloride using the same apparatus as in Example I.

67.5 g. (0.5 mol) of $SO_2Cl_2$ are added drop-wise under stirring and cooling with ice to a temperature of 20–25° C. during a time period of about 45 minutes to 315 g. of a 40.9% aqueous solution of sodium N-methyl dithiocarbamate. After 15 minutes of additional stirring the precipitated N,N'-dimethyl thiuram disulfide is filtered off under suction, washed with water and dried. The crude yield amounts to 91 g. which is equivalent to 85.9% of the theoretical. The purification can be accomplished as in the previous example.

*Example III.*—*Production of tetramethyl thiuram disulfide*

29.75 g. (0.25 mol) of $SOCl_2$ are added drop-wise under cooling with ice and stirring during a time period of 30 minutes to 150 cc. of a solution of the sodium salt of N,N-dimethyl dithiocarbamic acid which contains 71.5 g. (0.5 mol) of the salt. The temperature does not increase above 25° C. The precipitated substance is filtered off by suction and recrystallized from alcohol. The melting point is 150.5–152.5° C. The calculated amount of nitrogen is 11.7% and the amount found by analysis is 11.8%.

*Example IV.—Production of thiuram disulfide*

16.9 g. (0.125 mol) of $SO_2Cl_2$ are added drop-wise under stirring and cooling (the temperature not increasing above 20° C.) during a time period of 15 minutes to 27.5 g. (0.25 mol) of the ammonium salt of dithiocarbamic acid dissolved in 100 cc. of water. The precipitated substance is filtered off under suction and reprecipitated from acetone/chloroform. The melting point is 150–153° C. (with decomposition). The calculated amount of nitrogen is 15.2% and the amount found upon analysis is 15.0%.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be secured by Letters Patent is:

1. The method of producing a thiuram disulfide of the formula

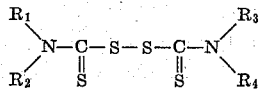

wherein $R_1$, $R_2$, $R_3$ and $R_4$ are each selected from the group consisting of hydrogen and lower alkyl, which comprises reacting a molecule of a salt of a dithiocarbamic acid of the formula

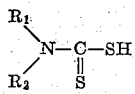

wherein $R_1$ and $R_2$ have the same definitions as above, with a molecule of a salt of a dithiocarbamic acid of the formula

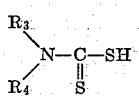

wherein $R_3$ and $R_4$ have the same definitions as above, and with a liquid condensation agent selected from the group consisting of liquid thionyl halides and liquid sulfuryl halides under cooling.

2. The method of producing a thiuram disulfide of the formula

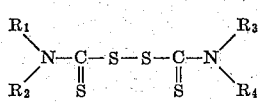

wherein $R_1$, $R_2$, $R_3$ and $R_4$ are each selected from the group consisting of hydrogen and lower alkyl, which comprises reacting a molecule of a salt of a dithiocarbamic acid of the formula

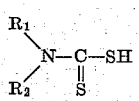

wherein $R_1$ and $R_2$ have the same definitions as above, with a molecule of a salt of a dithiocarbamic acid of the formula

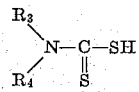

wherein $R_3$ and $R_4$ have the same definitions as above, and with liquid thionyl chloride under cooling.

3. The method of producing a thiuram disulfide of the formula

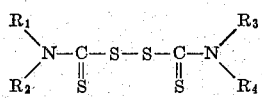

wherein $R_1$, $R_2$, $R_3$ and $R_4$ are each selected from the group consisting of hydrogen and lower alkyl, which comprises reacting a molecule of a salt of a dithiocarbamic acid of the formula

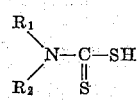

wherein $R_1$ and $R_2$ have the same definitions as above, with a molecule of a salt of a dithiocarbamic acid of the formula

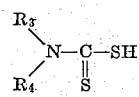

wherein $R_3$ and $R_4$ have the same definitions as above, and with liquid sulfuryl chloride under cooling.

4. The method of producing a thiuram disulfide of the formula

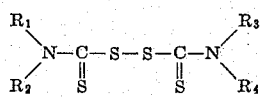

wherein $R_1$, $R_2$, $R_3$ and $R_4$ are each selected from the group consisting of hydrogen and lower alkyl, which comprises reacting in aqueous solution a molecule of an alkali metal salt of a dithiocarbamic acid of the formula

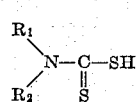

wherein $R_1$ and $R_2$ have the same definitions as above, with a molecule of an alkali metal salt of a dithiocarbamic acid of the formula

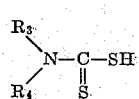

wherein $R_3$ and $R_4$ have the same definitions as above, and with a liquid condensation agent selected from the group consisting of liquid thionyl halides and liquid sulfuryl halides under cooling.

5. The method of producing a thiuram disulfide of the formula

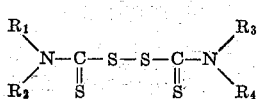

wherein $R_1$, $R_2$, $R_3$ and $R_4$ are each selected from the group consisting of hydrogen and lower alkyl, which comprises reacting in aqueous solution a molecule of the ammonium salt of a dithiocarbamic acid of the formula

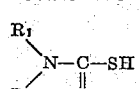

wherein $R_1$ and $R_2$ have the same definitions as above, with a molecule of the ammonium salt of a dithiocarbamic acid of the formula

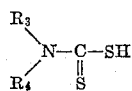

wherein $R_3$ and $R_4$ have the same definitions as above, and with a liquid condensation agent selected from the group consisting of liquid thionyl halides and liquid sulfuryl halides under cooling.

6. The method which comprises reacting a salt selected from the group consisting of alkali metal and ammonium salts of N-methyl dithiocarbamic acid with liquid thionyl chloride under cooling.

7. The method which comprises reacting a salt selected from the group consisting of alkali metal and ammonium salts of N-methyl dithiocarbamic acid with liquid sulfuryl chloride under cooling.

8. The method which comprises reacting a salt selected from the group consisting of alkali metal and ammonium salts of N,N-dimethyl dithiocarbamic acid with liquid thionyl chloride under cooling.

9. The method which comprises reacting a salt selected from the group consisting of alkali metal and ammonium salts of N,N-dimethyl dithiocarbamic acid with liquid sulfuryl chloride under cooling.

References Cited by the Examiner

UNITED STATES PATENTS

| | | |
|---|---|---|
| 1,634,925 | 7/27 | Whitby. |
| 1,876,059 | 9/32 | Klein _____ 260—567 |
| 2,375,083 | 5/45 | Cooper _____ 260—567 X |
| 2,751,415 | 6/56 | Cheshire et al. _____ 260—567 |
| 2,777,878 | 1/57 | Counts et al. _____ 260—567 |

OTHER REFERENCES

Reid, "Organic Chemistry of Bivalent Sulfur," vol. I, pp. 124–125 (1958).

CHARLES B. PARKER, *Primary Examiner.*

LEON ZITVER, *Examiner.*